US011668280B2

(12) United States Patent
Arroyo Beltri et al.

(10) Patent No.: US 11,668,280 B2
(45) Date of Patent: Jun. 6, 2023

(54) YAW SYSTEMS AND METHODS

(71) Applicant: General Electric Renovables Espana, S.L., Barcelona (ES)

(72) Inventors: Pedro Arroyo Beltri, Barcelona (ES); Luca Vita, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/724,897

(22) Filed: Apr. 20, 2022

(65) Prior Publication Data
US 2022/0341391 A1    Oct. 27, 2022

(30) Foreign Application Priority Data

Apr. 21, 2021   (EP) ..................... 21382348

(51) Int. Cl.
F03D 7/02    (2006.01)

(52) U.S. Cl.
CPC ...... *F03D 7/0204* (2013.01); *F05B 2270/321* (2013.01); *F05B 2270/329* (2013.01)

(58) Field of Classification Search
CPC .. F03D 7/0204; F03D 7/045; F05B 2270/321; F05B 2270/329
See application file for complete search history.

(56) References Cited

U.S. PATENT DOCUMENTS

| 7,822,560 | B2* | 10/2010 | LeMieux | ................ F03D 7/042 |
| | | | | 324/207.16 |
| 2006/0140761 | A1* | 6/2006 | LeMieux | ................ F03D 7/042 |
| | | | | 416/61 |
| 2009/0068013 | A1* | 3/2009 | Birkemose | .............. F03D 7/024 |
| | | | | 416/31 |
| 2020/0102932 | A1* | 4/2020 | Hovgaard | ............... F03D 7/042 |

FOREIGN PATENT DOCUMENTS

EP       3757385 A1    12/2020

OTHER PUBLICATIONS

European Search Report Corresponding to EP21382348 dated Sep. 30, 2021.

* cited by examiner

*Primary Examiner* — Eldon T Brockman
(74) *Attorney, Agent, or Firm* — Dority & Manning, P.A.

(57) ABSTRACT

The present disclosure relates to methods which comprise receiving a wind direction signal indicative of an instantaneous wind direction at a wind turbine, filtering the wind direction signal to determine a filtered wind direction signal and determining a yaw error signal of the wind turbine indicating a difference between a yaw angle of the wind turbine and the instantaneous wind direction indicated by the filtered wind direction signal. The methods furthermore comprise determining a control signal for a yaw system of the wind turbine based on the yaw error signal. Filtering the wind direction signal comprises applying a low pass filter with a variable time constant, wherein the variable time (Continued)

constant is dependent on a wind condition. The present disclosure further relates to control systems for wind turbines which are configured to implement such methods. The present disclosure further relates to methods of operating wind turbines.

11 Claims, 5 Drawing Sheets

YAW SYSTEMS AND METHODS

The present disclosure relates to wind turbines, and more particularly relates to yaw systems and methods for wind turbines.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that contains and protects e.g. the gearbox (if present) and the generator and, depending on the wind turbine, further components such as a power converter, and auxiliary systems.

A wind turbine will operate most efficiently if it is aligned with the prevailing wind direction at any time i.e. if the rotor axis of the wind turbine rotor coincides or is close to the direction of the incoming wind. A wind sensing system may be provided on the nacelle or elsewhere, and based on measurements from the wind sensing system, the nacelle may be rotated to align with the wind using a yaw system.

A yaw system may comprise a first bearing ring attached to the tower, and a second bearing attached to the nacelle, and particularly a bedplate or frame of the nacelle. Yaw actuators may be provided that rotate the nacelle. The yaw actuators may be electric motors, which through reduction gearing drive a pinion that meshes with an annular gear to rotate the nacelle.

In practice however, the wind direction continuously changes. Continuous alignment with the wind can lead to excessive wear of the yaw system, and a reduced lifetime of the yaw system. Improved wind turbine operation therefore includes finding an optimum or good balance between continuous alignment with the wind in order to maximize power output, and avoiding excessive use of the yaw system.

SUMMARY

In an aspect of the present disclosure, a method is provided, which comprises receiving a wind direction signal indicative of an instantaneous wind direction at a wind turbine, and filtering the wind direction signal to determine a filtered wind direction signal. The method further comprises determining a yaw error signal of the wind turbine indicating a difference between a yaw angle of the wind turbine and the instantaneous wind direction indicated by the filtered wind direction signal and determining a control signal for a yaw system of the wind turbine based on the yaw error signal. Herein, filtering the wind direction signal comprises applying a low pass filter with a variable time constant, wherein the variable time constant is dependent on a wind condition.

In accordance with this aspect, a method is provided which finds a good equilibrium for the yaw system between avoiding excessive operation of the yaw system and optimizing power output of the wind turbine. By changing a time constant for a low pass filter based on a wind condition, the yaw system can be made more reactive or less reactive based on a wind condition. At the same time, the overall control in terms of e.g. PID control or maximum allowable wind deviation can be the same for different wind conditions. The thresholds do not need to be adapted for different wind conditions and it can thus be avoided that a wind turbine is misaligned at a relatively large value for a long period of time.

In a further aspect, a control system for a wind turbine is provided, which is configured to receive a wind direction signal indicative of an instantaneous wind direction at a wind turbine, and to filter the wind direction signal to determine a filtered wind direction signal by applying a low pass filter with a variable time constant, wherein the variable time constant is dependent on a wind condition. The control system is further configured to determine a yaw error signal of the wind turbine indicating a difference between a yaw angle of the wind turbine and the instantaneous wind direction indicated by the filtered wind direction signal; and to determine a control signal for a yaw system of the wind turbine based on the yaw error signal.

In yet a further aspect, a method for operating a wind turbine is provided. The method comprises measuring a wind direction signal indicative of an instantaneous wind direction at a wind turbine and filtering the wind direction signal by applying a slow low pass filter with a variable time constant, wherein the variable time constant is dependent on a wind condition. The method further comprises determining a yaw error of the wind turbine relative to the measured instantaneous wind direction. If the yaw error is above a yaw error threshold, the method comprises yawing the wind turbine to reduce the yaw error.

DETAILED DESCRIPTION OF EXAMPLES

Figure 1:
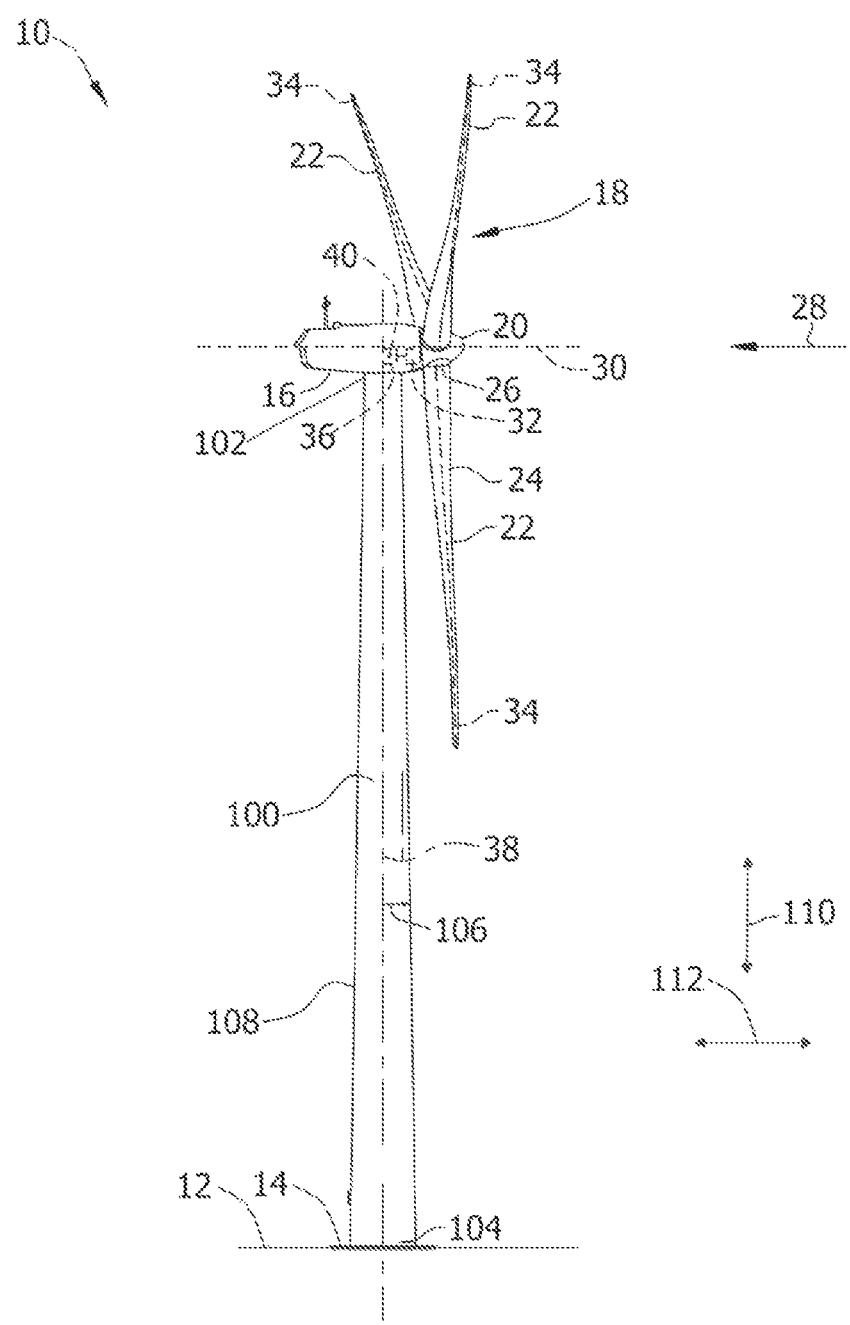
FIG. 1 schematically illustrates a perspective view of one example of a wind turbine.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 100 that extends from a support system 14 on a ground 12, a nacelle 16 mounted on tower 100, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 100 may be fabricated from tubular steel to define a cavity (not shown in FIG. 1) between a support system 14 and the nacelle 16. In an alternative embodiment, the tower 100 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced on the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
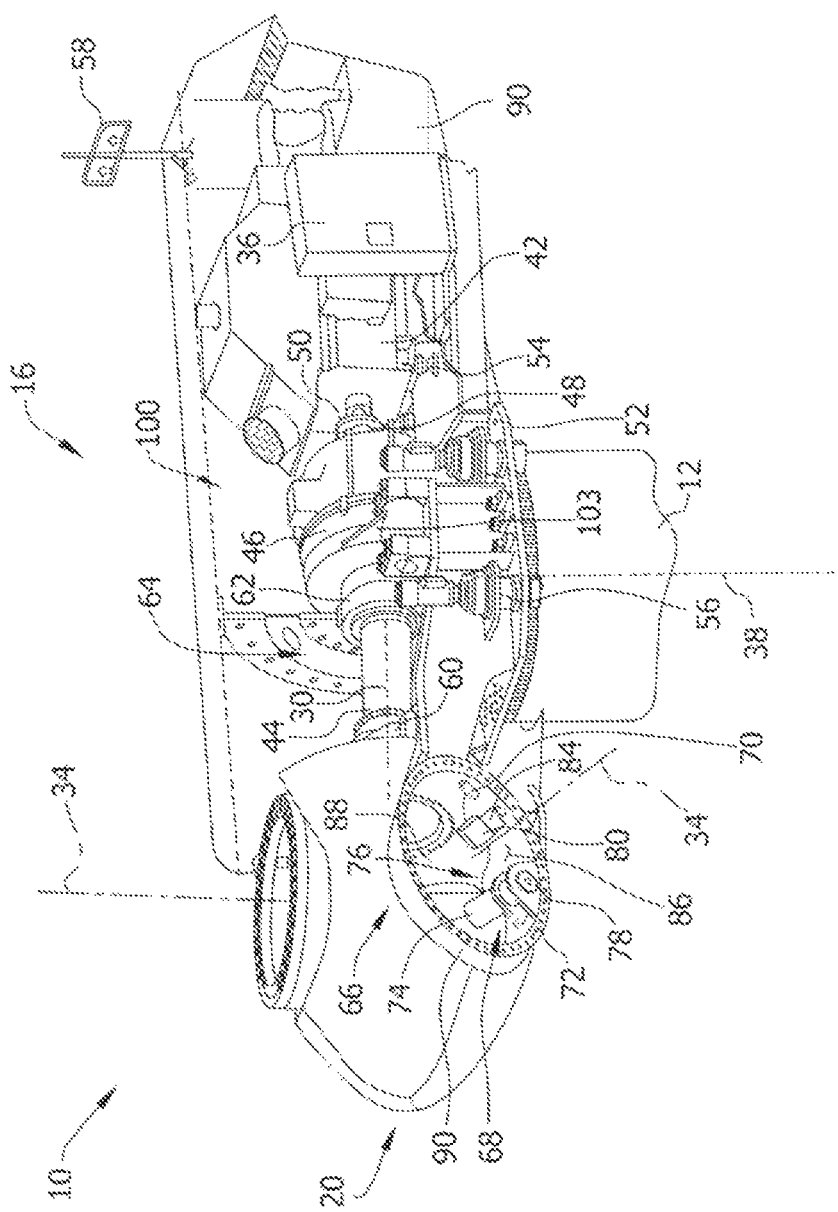
FIG. 2 illustrates a simplified, internal view of one example of the nacelle of the wind turbine of FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables 160 from the nacelle 16 into the tower 100.

The gearbox 46, generator 42 in transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 100 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery, electric capacitors hence letter or an electrical generator driven by the rotation of the hub 20, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to outer surface.

Figure 3:
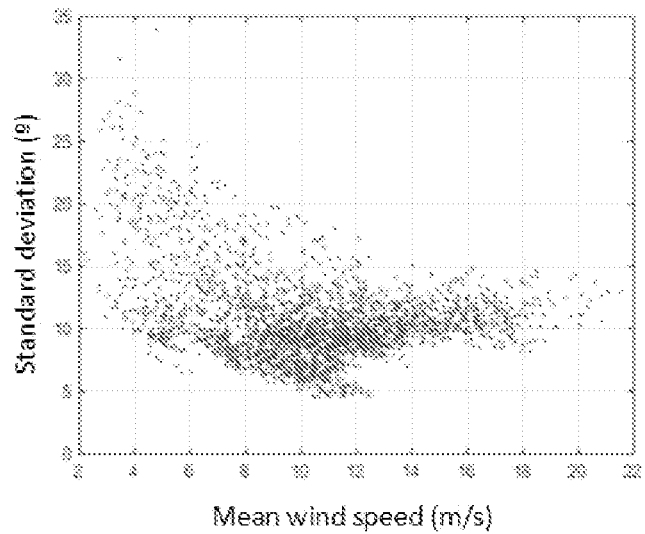
FIG. 3 illustrates wind direction variation as a function of wind speed for a given site.

FIG. 3 illustrates wind direction variation as a function of wind speed for a given site. In this figure, the standard deviation of a wind direction over a given time interval (e.g., 10 minutes) is shown, plotted against a mean wind speed over the same time interval. It may be seen that at the particular site of FIG. 3, wind direction is much more variable at lower wind speeds than at higher wind speeds. This is a phenomenon that may be found at many different wind sites. This means that in general more activity of the yaw system is required at lower wind speeds to keep the wind turbine aligned with the incoming wind. Increased activity of the yaw system leads to wear of the yaw system, and possible early failure, and it also leads to increased energy use during operation of the wind turbine.

At the same time, the electrical power output that can be gained by aligning with the wind direction is lower at lower wind speeds than at higher wind speeds. An equilibrium therefore needs to be found between actuation of the yaw system and allowing a certain deviation of the wind turbine with respect to the wind direction.

Figure 4:
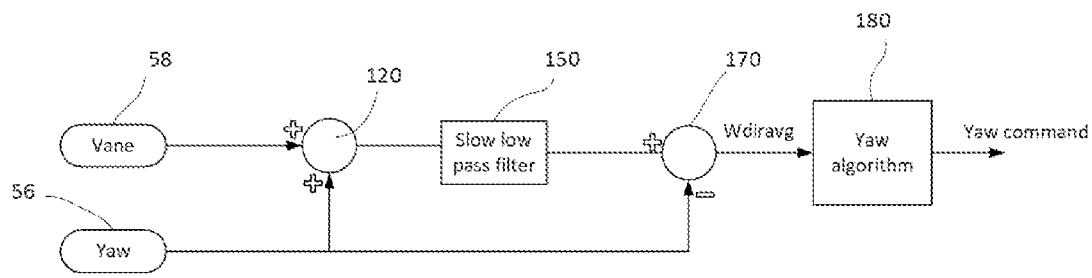
FIG. 4 schematically illustrates an example of a method for generating a yaw command.

FIG. 4 schematically illustrates an example of a method which comprises receiving a wind direction signal indicative of an instantaneous wind direction at a wind turbine, filtering the wind direction signal to determine a filtered wind direction signal, and determining a yaw error signal of the wind turbine indicating a difference between a yaw angle of the wind turbine and the instantaneous wind direction indicated by the filtered wind direction signal. The method further comprises determining a control signal for a yaw system of the wind turbine based on the yaw error signal. Filtering the wind direction signal comprises applying a low pass filter with a variable time constant, wherein the variable time constant is dependent on a wind condition.

A wind direction signal indicative of an instantaneous wind direction at a wind turbine may be an absolute signal of a wind direction or may be a relative signal, i.e. indicating a wind direction with respect to a current yaw position. The wind direction signal may be measured directly by a nacelle mounted wind vane or other device, or may be based on a measurement signal. In the latter case, the wind direction signal may be composed of the measured signal and a further constant, factor or further signal. For example, the wind direction signal may be composed of a measured signal from a nacelle mounted wind measurement device (which would provide a relative signal) and the actual yaw position. The wind direction signal in this case may be an absolute signal.

By using variable time constants, maximum allowable deviations (thresholds) and other control aspects do not need to be altered. High loads due to higher misalignment for a prolonged period of time can be avoided. Similarly, excessive yawing (with a relatively low deviation threshold) can be avoided as well.

In the example of FIG. 4, the signal indicative of an instantaneous wind direction with respect to a current yaw position may be derived from a measurement of wind vane 58, e.g. a nacelle mounted wind vane. The measurement signal may be a relative wind direction. To this relative wind direction, a current yaw position may be added at block 120. The wind direction signal of block 120 in this case is an absolute signal indicating the wind direction. The wind direction signal of block 120 may be filtered by applying a slow low pass filter at block 150.

The low pass filter of block 150 may have a variable time constant. More particularly, the time constant of the low pass filter may be dependent on wind condition.

In some examples, the wind condition upon which the time constant depends is a wind speed. The variable time constant may be higher for a first wind speed range, and may be lower for a second wind speed range, wherein the first wind speed range is lower than the second wind speed range.

A yaw error signal may be determined at block 170 by comparing a current wind direction (as indicated by the filtered wind direction signal) with a current yaw position, provided by yaw (control) system 56. The yaw error signal may be indicative of an average deviation of a wind direction with respect to the current wind direction. The yaw error signal may be supplied to a yaw control system, or to a main wind turbine controller. Based on the yaw error signal, and based on the yaw algorithm 180, a suitable yaw command may be generated. Within the scope of the present disclosure, different yaw algorithms may be used. In one particular example, the yaw algorithm comprises comparing the yaw error signal with a (maximum) threshold value. If the yaw error signal is below the threshold value, then no yawing action is undertaken. If the yaw error signal is above the threshold value, the yaw system is activated to reduce the yaw error to zero.

In other examples, a yaw algorithm may include a PID control. A proportional-integral-derivative controller (PID controller) is a control loop mechanism employing feedback and which continuously calculates an error value as the difference between a desired setpoint (in this case, alignment with the wind direction) and a measured process variable (in this case a difference between yaw angle and wind direction) and applies a correction based on proportional, integral, and derivative terms (denoted P, I, and D respectively). PID control should not be understood herein that necessarily all three terms (proportional, integral and derivative) are used. In examples of the present disclosure, one or two of the terms may have a gains factor of zero, i.e. the PID control may be e.g. a PI control, or a PD control.

Alternatively, the feedback control herein embodied as a PID control may be embodied as any of Model Predictive Control (MPC), H-infinity methods, Linear-Quadratic (LQ) regulator. Further suitable algorithms for feedback control may also be used.

In some examples, the variable time constant linearly decreases from a first low wind speed to a second high wind speed. In other examples, the wind condition may be wind turbulence.

As mentioned before, the wind condition upon which the time constant depends may be a wind speed. The variable time constant may be higher for a first wind speed range, and lower for a second wind speed range, wherein the first wind speed range is lower than the second wind speed range. At lower wind speeds, the wind direction may be more variable. The time constant may be higher, which means that the yaw system is slower to react to wind direction changes. Unnecessary yawing can thus be avoided. At higher wind speed, the wind direction is more constant, and additionally most efficiency gains can be made at higher wind speed by aligning with the wind. The time constant may thus be lower, and the yaw system thus reacts more quickly at higher wind speeds.

Figure 5:
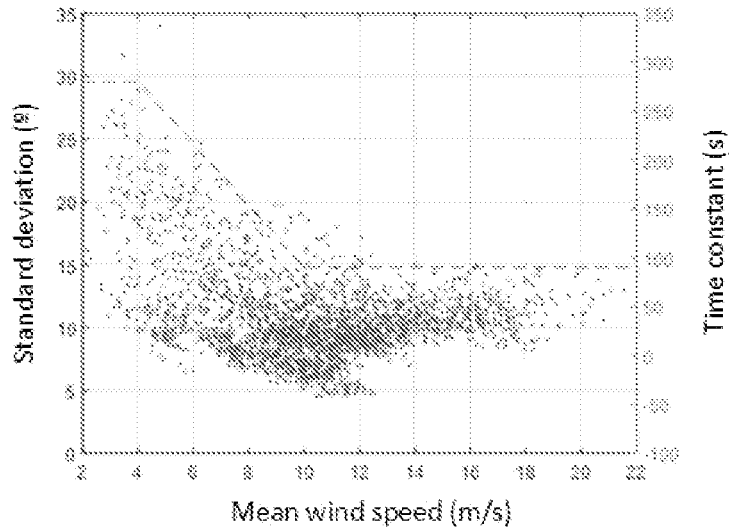
FIG. 5 schematically illustrates an example of a variation of a time constant for a low pass filter in the example of FIG. 4.

In the example, depicted in FIG. 5, a first wind speed range may range from a cut-in wind speed (e.g. around 3 m/s) to a nominal wind speed, or just below a nominal wind speed (e.g. around 10 m/s). A second wind speed range may range from around nominal wind speed or just below to about cut-out wind speed, e.g. around 25 m/s. In the higher wind speed range, the time constant may be between 60 and 120 seconds, and particularly between 75 and 110 seconds. In the lower wind speed range, a time constant may be between e.g. 90 and 300 seconds.

In some examples, the variable time constant may gradually or continuously vary between a first wind speed and a second wind speed. In some examples, and in particular in FIG. 5, the variable time constant linearly decreases from a first low wind speed to a second high wind speed. A continuous or gradual variation, such as the linear example of FIG. 5, can establish that for each different wind speed, a different speed of reaction is provided.

Figure 6:
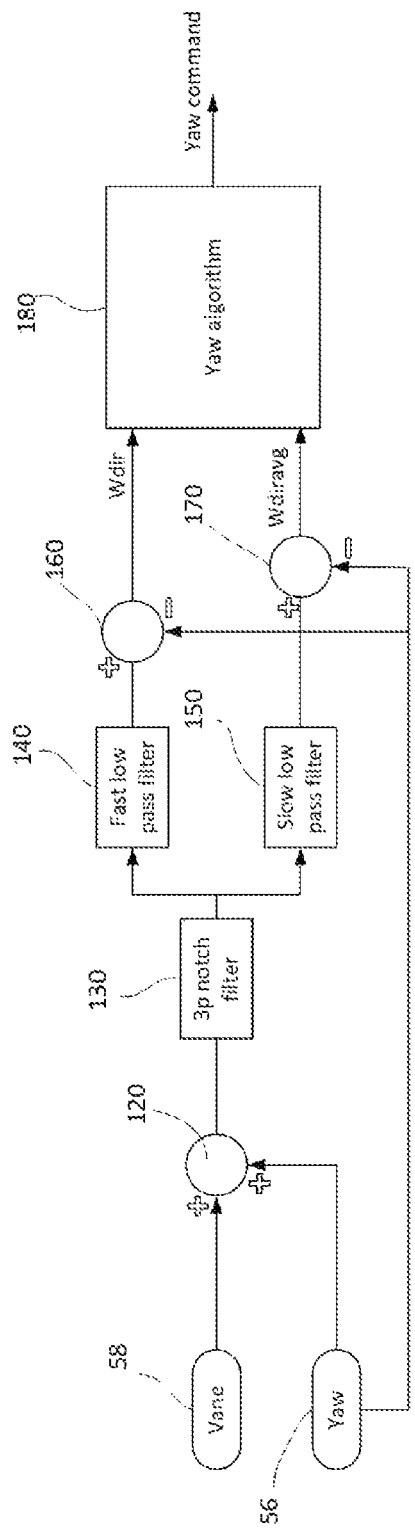
FIG. 6 schematically illustrates a further example for generating a yaw command.

FIG. 6 schematically illustrates a further example of a method for determining a yaw command signal. Similarly as in the example of FIG. 4, a nacelle mounted wind vane 58 may give an indication of an instantaneous relative wind direction. The yaw system 56 can provide information regarding the current yaw direction of the wind turbine. At block 120, the measurements may be added to generate a wind direction signal.

In the example of FIG. 6, filtering of the wind direction signal may further comprise filtering out signal deviations due to rotor blades. In particular, filtering out signal deviations due to rotor blades comprises applying a 3 p notch filter 130 in this example. A notch filter (also known as a bandstop filter or reject filter) is a filter that rejects or blocks the transmission of signals within a specific frequency range and allows frequencies outside that range. A 1 p frequency corresponds to the frequency of rotation of the wind turbine rotor. By applying a 3 p notch filter, signal deviations corresponding to effects caused by the three rotor blades may be filtered out. In the case of a nacelle mounted measurement system, the rotating blades can cause deviations in the wind direction measurement because they affect the air flow. Alternative (3 p) filters may be used.

In examples, the filtering the wind direction signal includes applying a slow low pass filter 150 to determine starting of a yawing operation, and applying a fast low pass filter 140 during a yawing operation to determine stopping of the yawing operation. In the example of FIG. 6, a fast low pass filter may be used during a yawing operation and to determine when to stop the yawing operation. A slow low pass filter may be used to determine when to start a yawing operation. During a yawing operation, the yaw error signal (at node 160, the difference between a filtered signal of an instantaneous wind direction and a current yaw angle) may vary relatively quickly, and the yaw operation can be stopped when the yaw error signal is small or close to zero. The time constant of the fast low pass filter may be e.g. between 5 and 30 seconds. The time constant of the slow low pass filter may be variable as noted before. The time constant of the slow low pass filter may depend on the wind speed, or another wind condition. The time constant, in the example of FIG. 5, of the slow low pass filter may vary between 90 and 270 seconds. The time constant of the fast low pass filter may be e.g. between 5 and 15% of the time constant of the slow low pass filter.

The time constant(s) may be adapted for a given wind site. Based on measurements, the variation of wind direction as a function of a wind condition (e.g. wind speed) may be determined for a given site. Suitable time constants, and suitable wind speed ranges for which these constants may be used can be based on these measurements.

In the example of FIG. 6, the control signal for a yaw system or "yaw command" of the wind turbine may be determined by a yaw algorithm at block 180 based on a yaw error signal (either at node 160, or at node 170). In some examples, the yaw error signal of node 170 may be compared with a threshold indicating a maximum allowable wind direction deviation. When the yaw error signal exceeds the threshold, a yawing operation may be started. During the yawing operation, the yaw error signal at node 160 may be monitored. As soon as the yaw error signal is reduced to zero, the yawing operation may be stopped. As long as the yaw error signal is above zero, the yawing operation continues, comprises comparing the filtered yaw error signal with a threshold.

In further examples, different, including more sophisticated yaw algorithms may be used.

The herein illustrated methods may also be carried out when the wind turbine does not receive power from an electrical grid. When a wind turbine is disconnected from the electrical grid, batteries or other back-up sources need to provide power to different auxiliary systems. Yawing operations may also be continued during such a situation. When the wind turbine can be connected to the grid again, and the wind turbine operation can be resumed, it is beneficial for the wind turbine to be substantially aligned with the prevailing wind direction. Using examples of the present disclosure, yawing operations may be optimized in terms of the load reducing effect that they can have: at higher wind speeds or e.g. higher turbulence, a lower time constant may be used, and at lower wind speeds, a higher time constant may be used.

The methods disclosed herein provide that the yaw system can maintain an alignment that is substantially the same as in prior art methods. However, the time and energy spent on yawing can be reduced, by reacting more slowly at lower wind speeds. Back-up power sources like batteries, ultracaps (ultracapacitors), diesel generators, solar panels or other therefore need to provide less power.

Figure 7:
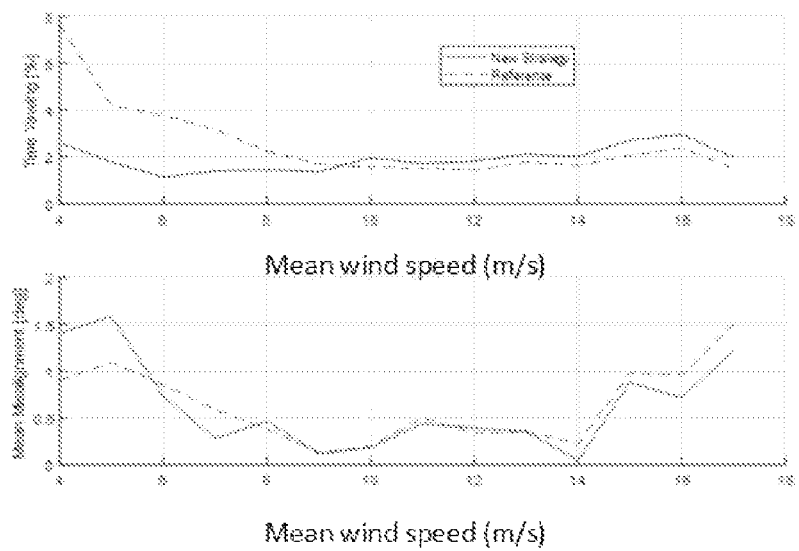
FIG. 7 schematically illustrates a comparison of methods for yawing using a variable time constant and a fixed time constant for a low pass filter.

FIG. 7 schematically illustrates a comparison of methods for yawing using a variable time constant and a fixed time constant for a low pass filter. In FIG. 7, the reference method is a method based on a yaw algorithm, for which the input is a yaw error signal. The yaw error signal is derived from a filtered wind direction signal indicating an instantaneous wind direction. The reference method has a fixed time constant. The line indicating the new strategy is based on the same yaw algorithm, however the yaw error signal is derived from a filtered wind direction signal with a variable time constant, and in particular, the time constant is lower at higher wind speeds, and the time constant is higher at lower wind speeds.

In the upper part of FIG. 7, a comparison is made between the time spent in yawing operations at different wind speeds. It may be seen that at lower wind speeds, with the methods according to the present disclosure, less time is spent yawing, whereas at higher wind speeds, slightly more time is spent in yawing operations. In the lower part of FIG. 7, a comparison is made between the mean misalignment at different wind speeds (misalignment may herein be regarded as the deviation between a yaw angle and an instantaneous wind direction). At lower wind speeds, the methods described herein allow for slightly higher mean misalignment, but at higher wind speeds, the misalignment is slightly reduced. The result is that with the same time spent on yawing (and thus roughly the same energy spent on yawing), the overall power generated by the wind turbine can be increased. Or the overall power generated by the wind turbine can be constant, but less time is spent yawing.

In a further aspect, a control system for a wind turbine is provided, which is configured to carry out any of the methods disclosed herein. The control system specifically may be configured to receive a wind direction signal indicative of an instantaneous wind direction at a wind turbine, filter the wind direction signal to determine a filtered wind direction signal by applying a low pass filter with a variable time constant, wherein the variable time constant is dependent on a wind condition. The control system may further be configured to determine a yaw error signal of the wind turbine indicating a difference between a yaw angle of the wind turbine and the instantaneous wind direction indicated by the filtered wind direction signal and to determine a control signal for a yaw system of the wind turbine based on the yaw error signal.

In yet a further aspect, the present disclosure provides a wind turbine comprising a tower, a nacelle rotatably mounted on the tower, and a yaw system for rotating the nacelle around a longitudinal axis of the tower such a control system.

In examples, the wind turbine may comprise a vane anemometer for providing the signal indicative of an instantaneous wind direction at the wind turbine to the control system. In other examples, the wind turbine may comprise a LIDAR, and the wind condition (wind speed, wind turbulence, or other) may be derived from measurements of the LIDAR system. In yet further examples, wind measurements may be provided from a remote measurement system like a met mast. A LIDAR may be able to determine different wind directions at different heights. In case of a variation of wind direction over the rotor swept area ("wind veer"), an average or mean wind direction may be determined.

In some examples, the wind condition (like wind speed) may be determined based on one or more of a power output of the wind turbine, a rotor speed, and a pitch angle of one or more wind turbine blades. Power output, rotor speed and pitch angle are control variables that are routinely measured or controlled in wind turbines. From the combination of these variables, a wind condition like wind speed can be calculated. In further examples, loads experienced by the wind turbine may be measured to determine the wind condition and/or to determine wind direction or deviation of the nacelle with respect to the incoming wind.

In yet a further aspect, a method for operating a wind turbine is provided which comprises measuring a wind direction signal indicative of an instantaneous wind direction at a wind turbine and filtering the wind direction signal by applying a slow low pass filter with a variable time constant, wherein the variable time constant is dependent on a wind condition. The method further comprises determining a yaw error of the wind turbine relative to the measured instantaneous wind direction, and if the yaw error is above a yaw error threshold, the method comprises yawing the wind turbine to reduce the yaw error.

Even though throughout the present disclosure, the time constant is varied particularly as a function of wind speed, the same or similar methods may be used for other wind conditions, like e.g. wind turbulence. Also at higher levels of turbulence, wind direction may vary more than at lower levels of turbulence. Therefore a time constant may be adapted as a function of wind turbulence as well. In examples, a time constant may be a function of both wind speed and wind turbulence.

Those of skill in the art would further appreciate that the various illustrative logical blocks, modules, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application.

The various illustrative logical blocks, modules, and algorithms described in connection with the disclosure herein may be implemented or performed with one or more general-purpose processors, a digital signal processor (DSP), cloud computing architecture, an application specific integrated circuit (ASIC), a field programmable gate array (FPGA), programmable logic controller (PLC) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The present disclosure also related to computing systems adapted to carry out any of the methods disclosed herein.

The present disclosure also relates to a computer program or computer program product comprising instructions (code), which when executed, performs any of the methods disclosed herein.

The computer program may be in the form of source code, object code, a code intermediate source and object code such as in partially compiled form, or in any other form suitable for use in the implementation of the processes. The carrier may be any entity or device capable of carrying the computer program.

If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method of operating a wind turbine, the method comprising:
   receiving a wind direction signal indicative of an instantaneous wind direction at the wind turbine;
   filtering the wind direction signal to determine a filtered wind direction signal, the filtering comprising applying a low pass filter with a variable time constant, wherein the variable time constant is dependent on a wind condition, wherein the wind condition is wind speed;
   determining a yaw error signal of the wind turbine indicating a difference between a yaw angle of the wind turbine and the instantaneous wind direction indicated by the filtered wind direction signal;
   determining a control signal for a yaw system of the wind turbine based on the yaw error signal;
   with the control signal, conducting a yawing operation with the yaw system;
   wherein the variable time constant is defined as a higher value for a first wind speed range, and is defined as a lower value for a second wind speed range, wherein the first wind speed range is lower than the second wind speed range;
   detecting the wind speed and assigning the value of the variable time constant based on whether the detected wind speed is in the first or second wind speed range.

2. The method of claim 1, wherein the variable time constant linearly decreases from a first wind speed to a second, higher, wind speed.

3. The method of claim 1, wherein the variable time constant is in a range between 60 seconds and 360 seconds.

4. The method of claim 1, wherein the filtering further comprises filtering out signal deviations due to rotor blades.

5. The method of claim 4, wherein the filtering out signal deviations due to rotor blades comprises applying a 3 p notch filter.

6. The method of claim 1, wherein the filtering comprises applying a slow low pass filter to determine starting of the yawing operation, and applying a fast low pass filter during the yawing operation to determine stopping of the yawing operation.

7. The method of claim 1, wherein determining the control signal based on the yaw error signal comprises comparing the yaw error signal with a threshold.

8. The method of claim 1, further comprising operating the wind turbine without receipt of power from an electrical grid.

9. A control system for a wind turbine, wherein the control system is configured to carry out the method according to claim 1.

10. A wind turbine, comprising:
a tower;
a nacelle rotatably mounted on the tower;
a yaw system that rotates the nacelle around a longitudinal axis of the tower; and
a control system configured to carry out the method according to claim 1.

11. The wind turbine of claim 10, further comprising a vane anemometer that provides the signal indicative of an instantaneous wind direction at the wind turbine to the control system.

* * * * *